(12) United States Patent
Davis et al.

(10) Patent No.: US 10,803,499 B1
(45) Date of Patent: Oct. 13, 2020

(54) USING SENSOR DATA TO DETERMINE EMPLOYEE TASKS

(71) Applicants: Molly Beth Davis, Mountain View, CA (US); Ashlee Beggs, Mountain View, CA (US); Todd Elliott, Mountain View, CA (US); Roger Charles Meike, Redwood City, CA (US); Mike Gabriel, Foster City, CA (US)

(72) Inventors: Molly Beth Davis, Mountain View, CA (US); Ashlee Beggs, Mountain View, CA (US); Todd Elliott, Mountain View, CA (US); Roger Charles Meike, Redwood City, CA (US); Mike Gabriel, Foster City, CA (US)

(73) Assignee: Intuit Inc., Mountain View, CA (US)

( * ) Notice: Subject to any disclaimer, the term of this patent is extended or adjusted under 35 U.S.C. 154(b) by 508 days.

(21) Appl. No.: 15/221,582

(22) Filed: Jul. 27, 2016

(51) Int. Cl.
*G06Q 30/04* (2012.01)
*G06Q 10/10* (2012.01)
*G06Q 30/00* (2012.01)

(52) U.S. Cl.
CPC ......... *G06Q 30/04* (2013.01); *G06Q 10/1097* (2013.01); *G06Q 30/018* (2013.01)

(58) Field of Classification Search
None
See application file for complete search history.

(56) References Cited

U.S. PATENT DOCUMENTS

2007/0198222 A1* 8/2007 Schuster .................. G01D 1/00
702/187
2009/0012834 A1* 1/2009 Fahey ............ G06Q 10/063114
705/7.15

(Continued)

FOREIGN PATENT DOCUMENTS

EP            2738963 A1 *  6/2014   ............... H04Q 9/00

OTHER PUBLICATIONS

Klein, B. N., & David, K. K. (2010). Basic Approach of Timing in Context Aware Architectures Verified by Concrete Advantages. 2010 10th IEEE/IPSJ International Symposium on Applications and the Internet, 113-116. doi:10.1109/saint.2010.28 (Year: 2010).*

*Primary Examiner* — Matthew S Gart
*Assistant Examiner* — Tiera J Fletcher
(74) *Attorney, Agent, or Firm* — Ferguson Braswell Fraser Kubasta PC

(57) ABSTRACT

A method may include obtaining first sensor data from first sensors of first workspace devices and a first timestamp corresponding to the first sensor data. The first sensors of each workspace device may include a geolocation sensor. The first workspace devices may include an employee device corresponding to an employee. The method may further include obtaining task categories. Each task category may include a sensor data pattern. The method may further include calculating, for each task category, a first task distance between the sensor data pattern and the first sensor data. The method may further include determining a first task category based on the first task category having the first (Continued)

task distance that is shortest. The method may further include creating, based on the first task category, a first task instance with a start time equal to the first timestamp. The first task instance is assigned to the employee.

18 Claims, 13 Drawing Sheets

(56)  References Cited

U.S. PATENT DOCUMENTS

2012/0265691 A1* 10/2012 Chowdhury ..... G06Q 10/06314
  705/301
2015/0185054 A1* 7/2015 Hesch ................... G01D 9/005
  702/187
2016/0350691 A1* 12/2016 Davis ..................... G06Q 50/10
2017/0245806 A1* 8/2017 Elhawary .............. A61B 5/1122
2018/0012170 A1* 1/2018 Roberts ............. G06F 16/24578

* cited by examiner

USING SENSOR DATA TO DETERMINE EMPLOYEE TASKS

BACKGROUND

It can be difficult to reconstruct an accurate record of the tasks performed by employees in the field, especially when employees perform different tasks at different locations. Employee timesheets are often incomplete or inaccurate, which can complicate accounting, invoicing and reporting compliance with various government regulations. Different tasks may be billed at different rates, and may be governed by different regulations. In a service business, a bookkeeper may need to track down information from field employees to determine whether a task has been performed so that the task can be invoiced correctly. It can also be challenging to accurately divide the work performed by employees into task categories defined for the purpose of complying with various regulations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, over a network, first sensor data from first sensors of first workspace devices and a first timestamp corresponding to the first sensor data. The first sensors of each workspace device includes a geolocation sensor. The first workspace devices include an employee device corresponding to an employee. The method further includes obtaining task categories. Each task category includes a sensor data pattern. The method further includes calculating, for each task category, a first task distance between the sensor data pattern and the first sensor data. The method further includes determining a first task category based on the first task category having the first task distance that is shortest. The method further includes creating, based on the first task category, a first task instance with a start time equal to the first timestamp. The first task instance is assigned to the employee.

In general, in one aspect, one or more embodiments relate to a system including a task identification engine computing device including a temporal engine, a computer processor and a memory including instructions that, when executed by the computer processor, cause the computer processor to obtain, over a network, first sensor data from first sensors of first workspace devices and a first timestamp corresponding to the first sensor data. The first sensors of each workspace device includes a geolocation sensor. The first workspace devices include an employee device corresponding to an employee. The instructions further include obtaining task categories. Each task category includes a sensor data pattern. The instructions further include calculating, for each task category, a first task distance between the sensor data pattern and the first sensor data. The method further includes determining a first task category based on the first task category having the first task distance that is shortest. The method further includes creating, based on the first task category, a first task instance with a start time equal to the first timestamp. The first task instance is assigned to the employee. The system further includes a repository storing at least the first sensor data and the task categories.

In general, in one aspect, one or more embodiments of the invention relate to a non-transitory computer readable medium including instructions that, when executed by a processor, perform a method including obtaining, over a network, first sensor data from first sensors of first workspace devices and a first timestamp corresponding to the first sensor data. The first sensors of each workspace device includes a geolocation sensor. The first workspace devices include an employee device corresponding to an employee. The method further includes obtaining task categories. Each task category includes a sensor data pattern. The method further includes calculating, for each task category, a first task distance between the sensor data pattern and the first sensor data. The method further includes determining a first task category based on the first task category having the first task distance that is shortest. The method further includes creating, based on the first task category, a first task instance with a start time equal to the first timestamp. The first task instance is assigned to the employee.

Other aspects of the invention will be apparent from the following description and the appended claims.

DETAILED DESCRIPTION

Figure 1A:
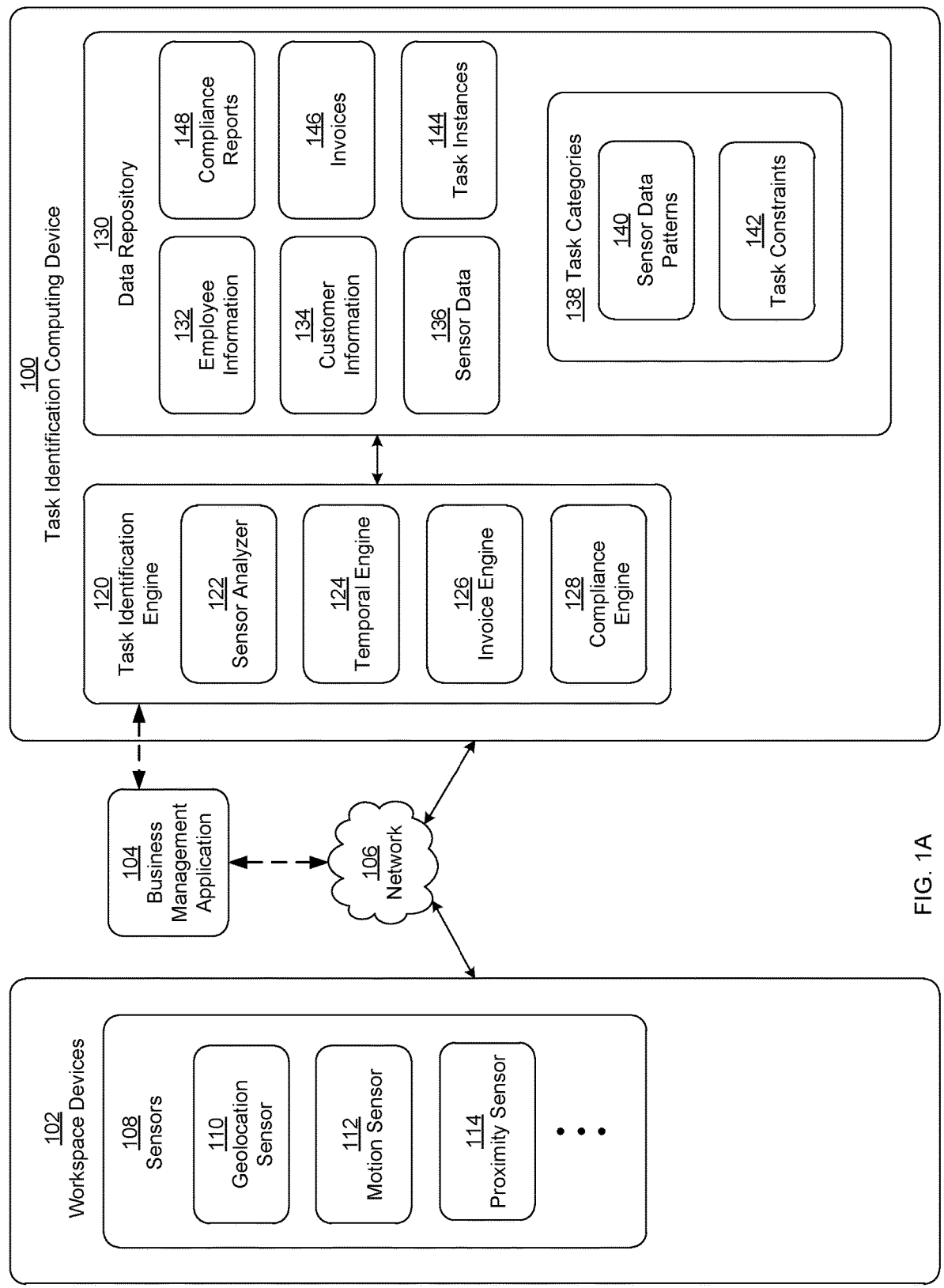
FIG. 1A and FIG. 1B show systems in accordance with one or more embodiments disclosed herein.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, system, and non-transitory computer readable medium, for automatically determining employee tasks based on sensor data. As a result, real-time tracking of employee tasks is possible, and therefore can improve the timeliness and accuracy of invoicing and reporting compliance with government regulations.

Specifically, embodiments of the invention are directed to determining employee tasks using sensor data obtained from a variety of workspace devices. The workspace devices may include employee cellphones, as well as devices installed on transport vehicles, inventory, tools, infrastructure, etc. Each device may include one or more sensors, for example, a geolocation sensor and motion sensor. Sensor data obtained from workspace devices may be analyzed to determine a closest task category consistent with the sensor data, where each task category is associated with a sensor data pattern.

The sensor data, when correlated with timestamps, may be used to identify start and end times of tasks. A task start time may be determined when sensor data matches a sensor data pattern associated with the closest task category. A task end time may be determined when the obtained sensor data no longer matches the sensor data pattern. The task category and start and end times may be used to generate an invoice based on the tasks performed by an employee. The customer for the invoice may be inferred using the obtained sensor data (e.g., using geolocation data of an employee's cellphone or truck to find the closest customer address). Alternatively, the task category and start and end times may be used to generate a compliance report for a regulatory agency.

The progress of tasks may be tracked in real time based on the obtained sensor data. An alert may be triggered when a violation of a constraint associated with a task category, an invoice, or a compliance regulation occurs. The rate at which sensor data is sampled may be increased in order to quickly resolve ambiguity when there are multiple possible task categories that closely match the sensor data.

FIG. 1A shows a schematic diagram of a system in accordance with one or more embodiments of the invention. As shown in FIG. 1A, the system includes a task identification computing device (100), workspace devices (102), a business management application (BMA) (104), and a network (106). Each of these components is described below.

In one or more embodiments, the task identification computing device (100), workspace devices (102), and BMA (104) may be connected via the network (106). The task identification computing device (100) may be the computing system (700) described with respect to FIG. 7A and the accompanying description below, or may be the client device (726) described with respect to FIG. 7B. The network (106) may be the network (720) described with respect to FIG. 7B. A workspace device (102) may be an internet of things device that includes sensors (108) and a connection to the network (106). Examples of workspace devices (102) include smart phones, transport devices (e.g., trucks, factory or shipping containers), inventory (e.g., work-in-process in a factory, a vehicle in an automotive repair shop), tools (e.g., drills, screwdrivers, various power tools), and infrastructure devices (e.g., factory machinery, geo-fences, beacons). A workspace device (102) may also be any computing device, such as a tablet, a laptop computer, a desktop computer, etc.

In one or more embodiments, a workspace device (102) may include sensors (108). The sensors (108) may include a geolocation sensor (110), a motion sensor (112), a proximity sensor (114) and/or various other sensors (e.g., a weight sensor, optical sensor, etc.). The geolocation sensor (110) may be any combination of software, firmware, and/or hardware that executes on the workspace device (102) to track the global position of the workspace device (102). The geolocation sensor (110) may be resident on the workspace device (102), or be accessed via a wireless connection with another source of geolocation information, for example, a mobile access point. In one or more embodiments, the geolocation sensor (110) includes functionality to return geolocation (such as global positioning system (GPS)) coordinates detailing the global position of the workspace device (102). The motion sensor (112) (e.g., an accelerometer) may be any combination of software, firmware, and/or hardware that executes on the workspace device (102) to provide motion data pertaining to the workspace device (102). The proximity sensor (114) may be any combination of software, firmware, and/or hardware that executes on the workspace device (102) to indicate when an object (e.g., an employee, smart phone, vehicle, inventory item, tool, etc.) enters a predefined region in proximity to the workspace device (102). Examples of proximity sensors (114) include geo-fences (e.g., for large predefined regions based on GPS coordinates) and beacons (e.g., for smaller predefined regions).

Continuing with FIG. 1A, in one or more embodiments, the task identification computing device (100) includes a task identification engine (120) and a data repository (130). In one or more embodiments, the data repository (130) is any type of storage unit and/or device (e.g., a file system, database, collection of tables, or any other storage mechanism) for storing data. Further, the data repository (130) may include multiple different storage units and/or devices. The multiple different storage units and/or devices may or may not be of the same type or located at the same physical site.

In one or more embodiments, the data repository (130) includes functionality to store employee information (132), customer information (134), sensor data (136), task categories (138), task instances (144), invoices (146), and compliance reports (148). In one or more embodiments of the invention, the employee information (132) may include information about the employee's skills, qualifications and/or licenses, and any workspace devices (102) associated with the employee (e.g., a smart phone and a truck). In addition, employee information (132) may include the task categories (138) corresponding to tasks the employee is qualified (e.g., and insured) to perform.

In one or more embodiments of the invention, the customer information (134) may include a list of customers and contact information, including a physical address, for each customer. In one or more embodiments of the invention, the customer information (134) may include a global position defined in geolocation coordinates corresponding to the physical address of the customer. For example, the global position may be obtained from a geocoding service that converts a physical address to a set of geolocation coordinates. Customer information may include additional information related to the performance of tasks for the customer.

Sensor data (136) may be represented in terms of the values of one or more sensor attributes measured at different points in time. For example, sensor data (136) may be geolocation data obtained from the geolocation sensor (110) or a proximity sensor (114) (e.g., a geo-fence). In one or more embodiments of the invention, geolocation data refers to any data that may be used for determining a location/position. Geolocation data may include, but is not limited to, information such as coordinates obtained or calculated by the sensor analyzer (122) (described below), distance information from landmarks (e.g., cellular towers), signal strength, and timestamp information.

In one or more embodiments, sensor data (136) may be motion data obtained from the motion sensor (112). Motion data may be represented in terms of one or more motion attributes, including the velocity, acceleration, torque and/or orientation of the workspace device (102). In one or more embodiments, the motion attributes may be represented using values for the x, y and z coordinate axes of the workspace device (102).

Continuing with FIG. 1A, in one or more embodiments, a task category (138) may include sensor data patterns (140) and task constraints (142). A task category (138) describes the type of work to be performed. Task categories (138) may be defined for different purposes and at varying levels of detail. In one or more embodiments, task categories (138) may be defined for invoicing purposes, where examples of invoicing task categories (138) may include: unclogging a sink, repairing a car, or any type of work-related activity related to a customer. In one or more embodiments, task categories (138) may be defined for compliance purposes, where examples of compliance task categories (138) may include: handling hazardous materials, working in a high-voltage or other type of dangerous environment, or any type of work-related activity related to compliance with a regulatory agency (e.g., where different workers' compensation or insurance rates may apply to different compliance task categories (138)).

A task instance (144) represents a specific instantiation of a task category (138). Examples of task instances (144) include: unclogging a specific sink, repairing a specific car, or any specific embodiment of a task category (138).

In one or more embodiments, a task category (138) may specify one or more sensor data patterns (140) based on sensor data (136) obtained from the sensors (108) of workspace devices (102). That is, a sensor data pattern (140) describes a pattern of sensor data (136) that is consistent with performing a task instance (144) in the task category (138). A task category (138), including its corresponding sensor data patterns (140) and task constraints (142), may be specific to an industry, or a company within an industry, as different companies and organizations may define and categorize tasks differently. As an example, a sensor data pattern (140) may specify a pattern of positions obtained from geolocation sensors (110) of one or more workspace devices (102). For example, a sensor data pattern (140) may specify a predefined target distance between the geolocation coordinates of a workspace device (102) corresponding to an employee and a workspace device (102) corresponding to an inventory item (e.g., where the inventory item may be a farm animal with a tracking device, a vehicle in a repair shop, or a work-in-process inventory item in a factory). The sensor data pattern (140) may further specify that geolocation coordinates of a workspace device (102) corresponding to a tool associated with the task category (138) be within a predefined target distance of the employee workspace device (102).

Alternatively, the sensor data pattern (140) may further specify that a proximity signal be received from a proximity sensor (114) of a workspace device (102) (e.g., a geo-fence or beacon) indicating that a workspace device (102) (e.g., a smart phone or vehicle corresponding to an employee) is positioned within a predefined region. For example, the predefined region may be a large region corresponding to a geo-fence (e.g., a farm area that houses livestock) or a small region corresponding to a beacon (e.g., a factory work area or a repair shop bay). Further expanding on the above example, the sensor data pattern (140) may specify a pattern of motion obtained from a motion sensor (112) of the tool (e.g., a repetitive motion of the tool within a predefined range of frequencies, such as a number of revolutions per minute). Alternatively, a distinctive pattern of motion may be specified relative to an employee performing a specific task. For example, a pattern of velocity data obtained from a motion sensor (114) of a workspace device (102) of an employee may correspond to a "snaking" motion of a plumber in the process of forcibly unclogging a pipe.

In addition, in one or more embodiments, data obtained from a proximity sensor (114) (e.g., a mobile beacon) may be used to identify a customer. For example, data obtained from a mobile beacon deployed on a car in a repair shop may indicate which car had a specific task instance (144) performed (e.g., based on information obtained from other sensors (108), such as a weight sensor that indicated the application or removal of fluids or other materials to or from the car).

In one or more embodiments, sensor data (136) obtained from the sensors (108) of workspace devices (102) may be compared to sensor data patterns (140) specified in task categories (138) to determine a closest task category (138) that best matches the sensor data (136). That is, the closest task category (138) may have a sensor data pattern (140) that most closely matches the attribute values specified in the sensor data (136). In one or more embodiments, this comparison may include calculating a task distance between the sensor data (136) and a sensor data pattern (140). The task distance may be thought of as a confidence level, or a probability that a given task category (138) corresponds to the obtained sensor data (136). For example, an attribute distance between the attribute values of the sensor data (138) may be calculated relative to the corresponding target attribute values or target attribute range of values specified in the sensor data pattern (140). The attribute distances may then be combined into a task distance (e.g., by applying weighting factors to the attribute distances). The task category (138) whose corresponding task distance is the shortest may represent the closest task category (138) consistent with the sensor data (136). In one or more embodiments, the task distance of the closest task category (138) may be required to be less than a maximum task distance. For example, it may be the case that the sensor data (136) is not consistent with a sensor data pattern (140) of any known task category (138) (e.g., the employee may be at lunch or on a work break running a personal errand).

In one or more embodiments, the task distance may be further based on contextual information obtained from a BMA. That is, if information obtained from a BMA provides support for identifying a specific task category (138), the task distance may be reduced for that specific category (e.g., according to a weighting factor). For example, an online calendar of an employee (e.g., an employee corresponding to a workspace device (102) contributing to the obtained sensor data (136)) may reference a specific task category (138) regarding a scheduled visit to a customer whose address is consistent with geolocation data in the obtained sensor data (136) of one or more workspace devices (102). Other examples of contextual information may include: previous invoices (146) involving the customer and/or previous compliance reports (148). Furthermore, there may be a work order contained in a BMA that specifies one or more task categories (138) corresponding to the calendar entry for the customer visit.

A task constraint (142) may specify requirements applicable to the task category (138). For example, a task constraint (142) may specify that an employee performing a task instance (144) corresponding to the task category (138)

possess certain qualifications or skills. For example, some task categories (138) may place an employee in physical danger, requiring that the employee possess certain training or skills (e.g., as indicated in the employee information (132) corresponding to the employee). A task constraint (142) may specify additional requirements including: a billing rate, types of tools, parts, and materials used when performing the task, minimum and maximum time required by the task, etc.

In one or more embodiments, an invoice (146) may be associated with, or include a task instance (144). In addition, the invoice (146) may specify constraints on task duration and cost, and may indicate how costs are calculated (e.g., an hourly rate based on the task category, an hourly rate based on the employee skill level, or a flat rate). In one or more embodiments, a compliance report (148) may be associated with, or include a task instance (144).

Figure 1B:
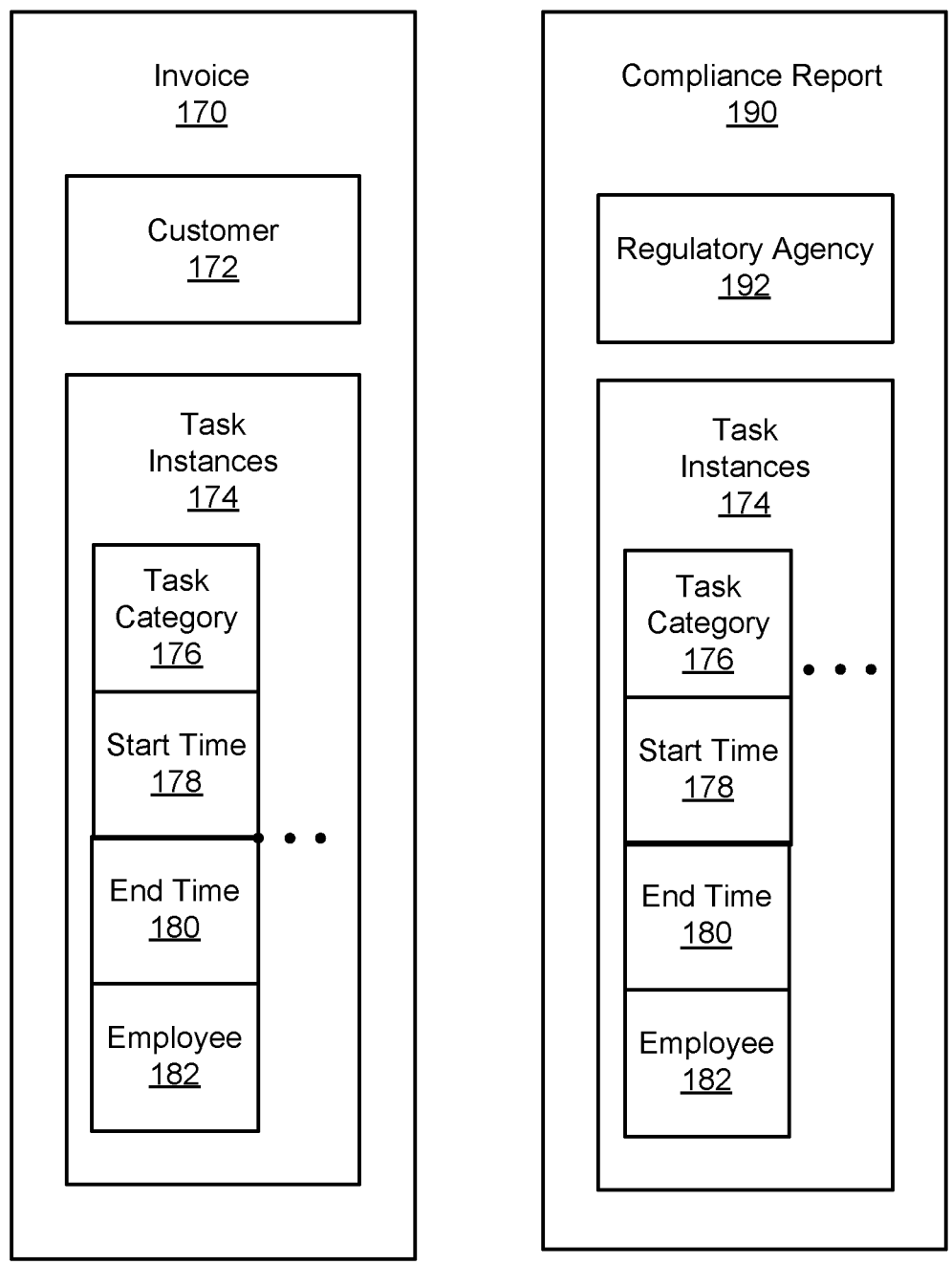

FIG. 1B shows a detailed view of an invoice (170) and a compliance report (190). An invoice may include a customer (172) and one or more task instances (174) corresponding to the various itemized tasks being performed on behalf of a customer (172). In one or more embodiments, a task instance (174) may include information pertaining to the instantiated task, including: a task category (176), a start time (178), an end time (180) and an employee (182) performing the task. For example, an invoice (170) may indicate that employee Bob performed a sink-unclogging task for customer Harry between 9-9:30 AM on September 1.

In one or more embodiments, there may be a work order (e.g., obtained from a BMA) that itemizes the various task instances (174) associated with an invoice (170).

A compliance report (190) may include a regulatory agency (192) and one or more task instances (174) corresponding to the various itemized tasks being reported for compliance purposes. In one or more embodiments, the task categories (176) used for compliance purposes may be different from the task categories (176) used for invoicing purposes. For example, the task categories (176) used for compliance purposes may be based on the level of risk to an employee (182) (e.g., for compliance with workers compensation regulations), while task categories (176) used for invoicing purposes may be based on customer, operational and/or accounting needs and requirements.

Returning to FIG. 1A, in one or more embodiments, the task identification computing device (100) includes and/or is operatively connected to a BMA (104). In one or more embodiments, a BMA (104) executes on one or more computing devices. For example, a BMA (104) may execute, wholly or in part, on a mobile computing device on which the task identification engine (120) executes. In one or more embodiments, a BMA (104) is any software for managing various aspects of a business.

In one or more embodiments of the invention, the BMA (104) is obtained from a software provider and installed and executed on one or more computing devices of a user. In one or more embodiments of the invention, the BMA (104) is provided by an application service provider, such as a software as a service (SaaS) provider. For example, the BMA (104) may be operated by the application service provider and accessed by the user on a subscription basis.

The BMA (104) may include functionality to process and/or store data corresponding to task identification. In one or more embodiments of the invention, the BMA (104) may be an invoicing application, a compliance reporting application (e.g., an application facilitating compliance and/or reporting relative to various regulations), accounting application, a tax preparation application, a payroll application, a personnel application, any personal financial management application, any combination thereof, or any other application for managing an aspect of a business.

In one or more embodiments of the invention, the task identification engine (120) includes a sensor analyzer (122), a temporal engine (124), an invoice engine (126), and a compliance engine (128). In one or more embodiments of the invention, the task identification engine (120) is operatively connected to the data repository (130). The task identification engine (120) may execute on a computing device. In one or more embodiments of the invention, the task identification engine (120) includes functionality to use various data to execute one or more algorithms to identify a task category (138) in real time based on sensor data (136). In one or more embodiments of the invention, the task identification engine (120) includes functionality to increase the rate at which sensor data (136) is sampled in order to quickly resolve ambiguities in the task identification process. Task identification is discussed further in the descriptions of FIG. 2, FIG. 3 and FIG. 4, below.

In one or more embodiments of the invention, a sensor analyzer (122) is any hardware (e.g., circuitry), software, firmware, and/or any combination thereof that includes functionality to obtain, process, and/or store sensor data. A sensor analyzer (122) may execute on a computing device.

In one or more embodiments of the invention, the sensor analyzer (122) includes functionality to obtain sensor data (136). For example, sensor data (136) may be obtained from the sensors (108) of one or more workspace devices (102) proximate to an employee's workspace device (102), in addition to the sensors (108) of the employee's workspace device (102). For example, sensor data (136) may be obtained from the sensors (108) of workspace devices (102) whose geolocation coordinates are within a predefined distance of the geolocation coordinates of the employee's workspace device (102). In one or more embodiments, the sensor analyzer (122) includes functionality to obtain geolocation data (not shown) and/or motion data. In one or more embodiments of the invention, GPS data, or a portion thereof, may be obtained from a GPS data source. The geolocation data source may be one or more GPS satellites, a location data provider providing data over the network (106), a cellular tower, and/or any other geolocation data source capable of providing information related to the location of the geolocation module. In one or more embodiments of the invention, the geolocation data source is operatively connected to the sensor analyzer (122). The sensor analyzer (122) may include functionality to determine position/location using the geolocation data received from the geolocation data source. Such a determination may include any amount of processing or calculation. For example, geolocation data may be obtained from three GPS satellites and include the location of the satellites and a timestamp. The sensor analyzer (122) may then perform a trilateration calculation and/or perform other processing steps to determine a longitude and latitude corresponding to the position of the sensor analyzer (122). In one or more embodiments, the sensor analyzer (122) may include functionality to determine a closest customer (e.g., using geolocation coordinates included in the customer information (134) corresponding to various customers) relative to sensor data (136) that includes geolocation coordinates corresponding to one or more workspace devices (102). As another example, when the sensor analyzer (122) is executing on a mobile device, such as a mobile phone, the geolocation data may additionally include data obtained over a wireless network and/or from one or more cellular towers, and such additional information may be used when determining position.

In one or more embodiments, the sensor analyzer (122) may include functionality to determine a closest customer (e.g., using geolocation coordinates included in the customer information (134) corresponding to various customers) relative to sensor data (136) that includes geolocation coordinates corresponding to one or more workspace devices (102).

In one or more embodiments, the sensor analyzer (122) may include functionality to detect that sensor data (136) (e.g., motion data) is periodic, such that the sensor data (136) may be represented in terms of amplitude, frequency, period and/or phase.

In one or more embodiments of the invention, the task identification engine (120) includes a temporal engine (124). In one or more embodiments of the invention, a temporal engine (124) is any hardware (e.g., circuitry), software, firmware, and/or any combination thereof that includes functionality to obtain, process, and/or store temporal data. In one or more embodiments of the invention, the temporal engine (124) includes functionality to obtain and/or generate temporal data. In one or more embodiments of the invention, temporal data refers to any data related to time or that may be used for determining a time. Such data may be stored in the data repository (130), and may include, but is not limited to, information such as temporal information included in and/or derived from geolocation data, information related to time received via a network, information related to time obtained locally from the device on which the temporal engine (124) executes, and/or any other source of temporal data. Temporal data may be stored in any unit of time (e.g., minutes, hours, days, etc.) and a given time value may be stored as one or more unit types. In one or more embodiments of the invention, though not shown in FIG. 1A, the task identification computing device (100) includes one or more clock devices for keeping time, and the temporal engine (124) may include functionality to obtain temporal data from the one or more clock devices.

In one or more embodiments of the invention, the task identification engine (120) includes an invoice engine (126). In one or more embodiments of the invention, the invoice engine (126) is any hardware (e.g., circuitry), software, firmware, and/or any combination thereof that includes functionality to generate and update invoices (146) in real time. The generation and update of invoices (146) is discussed further in the description of FIG. 3, below.

In one or more embodiments of the invention, the task identification engine (120) includes a compliance engine (128). In one or more embodiments of the invention, the compliance engine (128) is any hardware (e.g., circuitry), software, firmware, and/or any combination thereof that includes functionality to generate and update compliance reports (148) in real time. The generation and update of compliance reports (148) is discussed further in the description of FIG. 4, below.

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
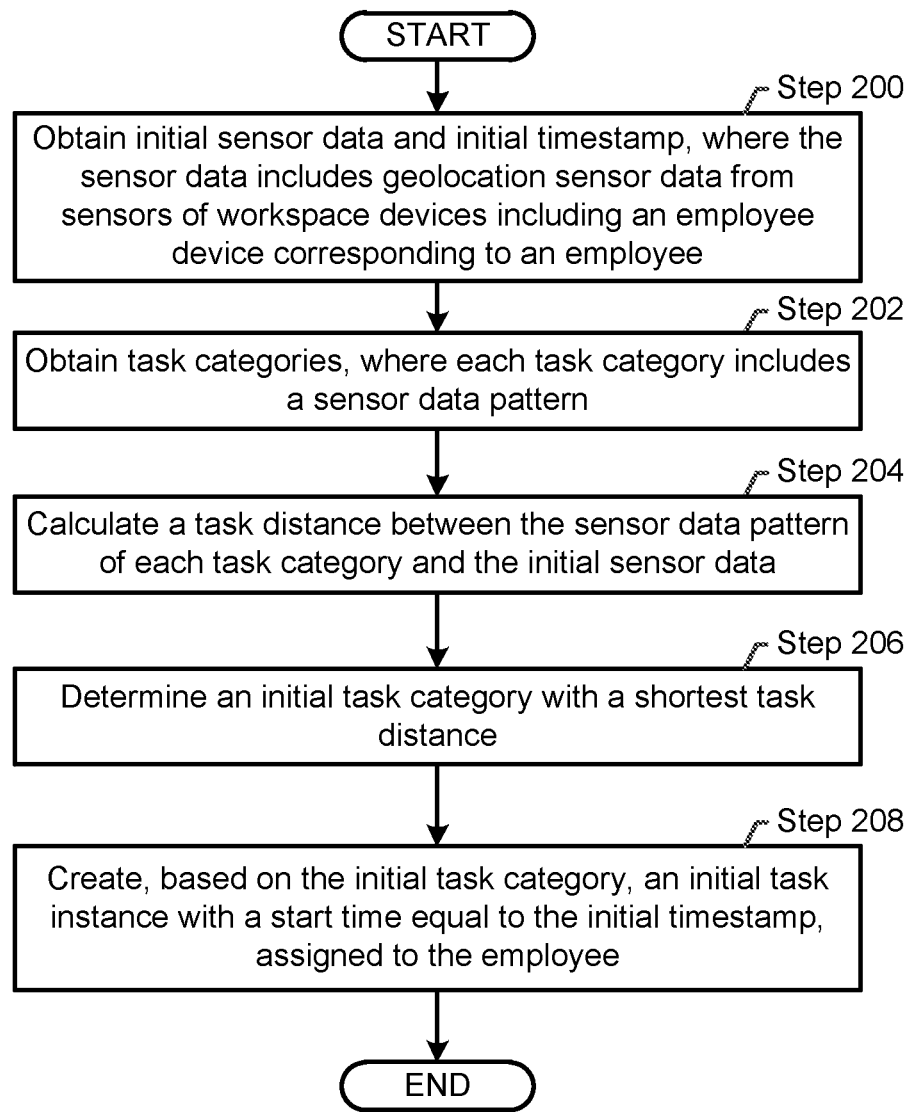
FIG. 2, FIG. 3, and FIG. 4 show flowcharts in accordance with one or more embodiments disclosed herein.

FIG. 2 shows a flowchart in accordance with one or more embodiments of the invention. The flowchart depicts a process for identifying an employee's task. One or more of the steps in FIG. 2 may be performed by the components of the task identification computing device (100), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, initial sensor data and an initial timestamp are obtained. In one or more embodiments, the initial sensor data includes geolocation sensor data obtained from sensors of one or more workspace devices proximate to an employee device, in addition to the sensors of the employee device. For example, sensor data may be obtained from the sensors of workspace devices whose geolocation coordinates are within a predefined distance of the geolocation coordinates of the employee device. In one or more embodiments, the employee device may be a cell phone or vehicle that includes a geolocation sensor (e.g., if the employee's cell phone runs out of power, geolocation data corresponding to the location of the employee may still be obtained from the employee's vehicle). Other examples of workspace devices may include tools and inventory items (e.g., a vehicle in a repair shop, or work-in-process in a factory). The sensor data may be obtained from various sensors of the workspace devices, including motion sensors and proximity sensors (e.g., geo-fences and beacons). Sensor data may be represented in terms of the values of one or more sensor attributes measured at different points in time. In one or more embodiments, the initial timestamp may be obtained from a clock (e.g., a clock of the task identification computing device (100)). Alternatively, the initial sensor data may already include the initial timestamp.

In Step 202, a group of task categories is obtained. The group of task categories may be obtained from a data repository. For example, the data repository may include task categories relevant to the operation of a business (e.g., for accounting purposes) and/or invoicing customers of the business. As another example, task categories may be defined for compliance reporting purposes (e.g., for workers' compensation reports). In one or more embodiments, a task category includes a sensor data pattern. That is, the sensor data pattern describes a pattern of sensor data consistent with performing a task instance in the task category. For example, a sensor data pattern may specify a predefined target distance between the geolocation coordinates of the employee workspace device and a workspace device corresponding to an inventory item. For example, an animal handling task category may correspond to a sensor data pattern where an employee device is within a predefined target distance relative to an animal-tracking device (e.g., the animal-tracking device includes a geolocation sensor).

In one or more embodiments, a task category may include one or more task constraints that specify requirements applicable to the task category. For example, a task constraint may specify that an employee performing a task instance corresponding to the task category possess certain qualifications or skills (e.g., as indicated in employee information corresponding to the employee).

In Step 204, a task distance between the sensor data pattern of each task category (obtained in Step 202) and the initial sensor data is calculated. For example, in one or more embodiments, an attribute distance between attribute values of the initial sensor data may be calculated relative to the corresponding target attribute values or target attribute range values specified in the sensor data pattern of a task category. The attribute distances may then be combined into a task distance (e.g., by applying weighting factors to the attribute distances). In one or more embodiments, the task distance may be further based on contextual information obtained from a BMA that provides support for identifying a specific task category, in which case the task distance may be reduced for that task category (e.g., according to a weighting factor). For example, an online calendar of the employee (e.g., the employee corresponding to the employee device providing initial sensor data obtained in Step 200) may reference a specific task category regarding a scheduled visit to a customer (e.g., a customer whose address is consistent with geolocation data obtained from the employee device).

In Step 206, an initial task category is determined, where the initial task category has the shortest task distance calculated in Step 204. In one or more embodiments, the shortest task distance may be required to be less than a predefined maximum task distance. For example, it may be the case that the initial sensor data is inconsistent with a sensor data pattern of any known task category (e.g., the employee may be at lunch or on a break).

In Step 208, an initial task instance assigned to the employee with a start time equal to the initial timestamp is created, based on the initial task category. That is, the initial task instance (e.g., unclogging a specific customer's sink) represents a specific instantiation of the initial task category (e.g., unclogging a sink). In one or more embodiments, one or more task constraints of the initial task category may be checked when the initial task instance is created, and a task constraint violation alert may be generated if a task constraint is not satisfied. For example, the initial task category may specify that the employee performing a task instance corresponding to the initial task category possess certain qualifications. For example, a task category may involve an element of danger, requiring that the employee possess certain training or skills (e.g., as indicated in the employee information (132) corresponding to the employee). As another example, the sink-unclogging task category may specify that the employee possess a plumber's license.

Figure 3:
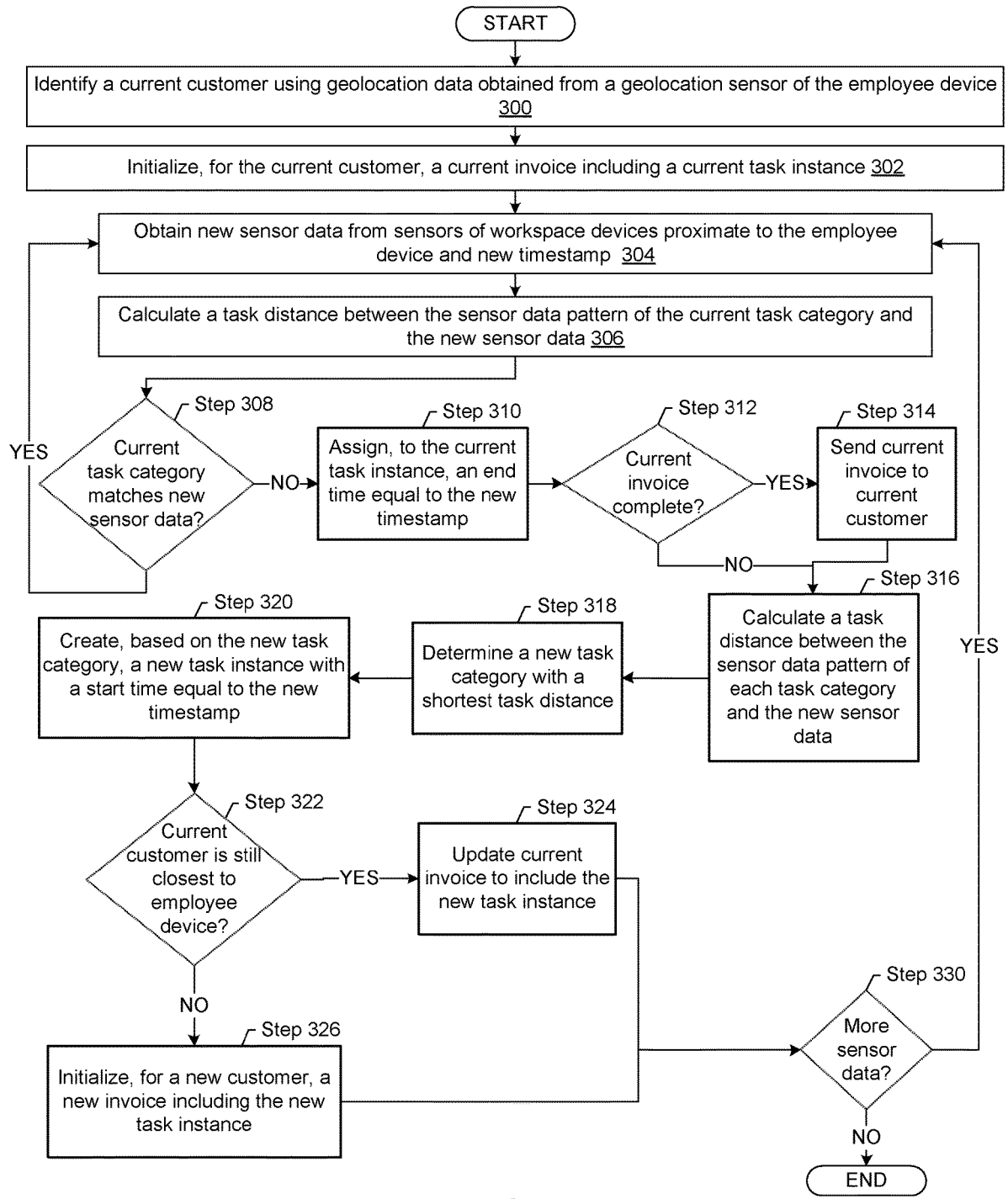
Figure 4:
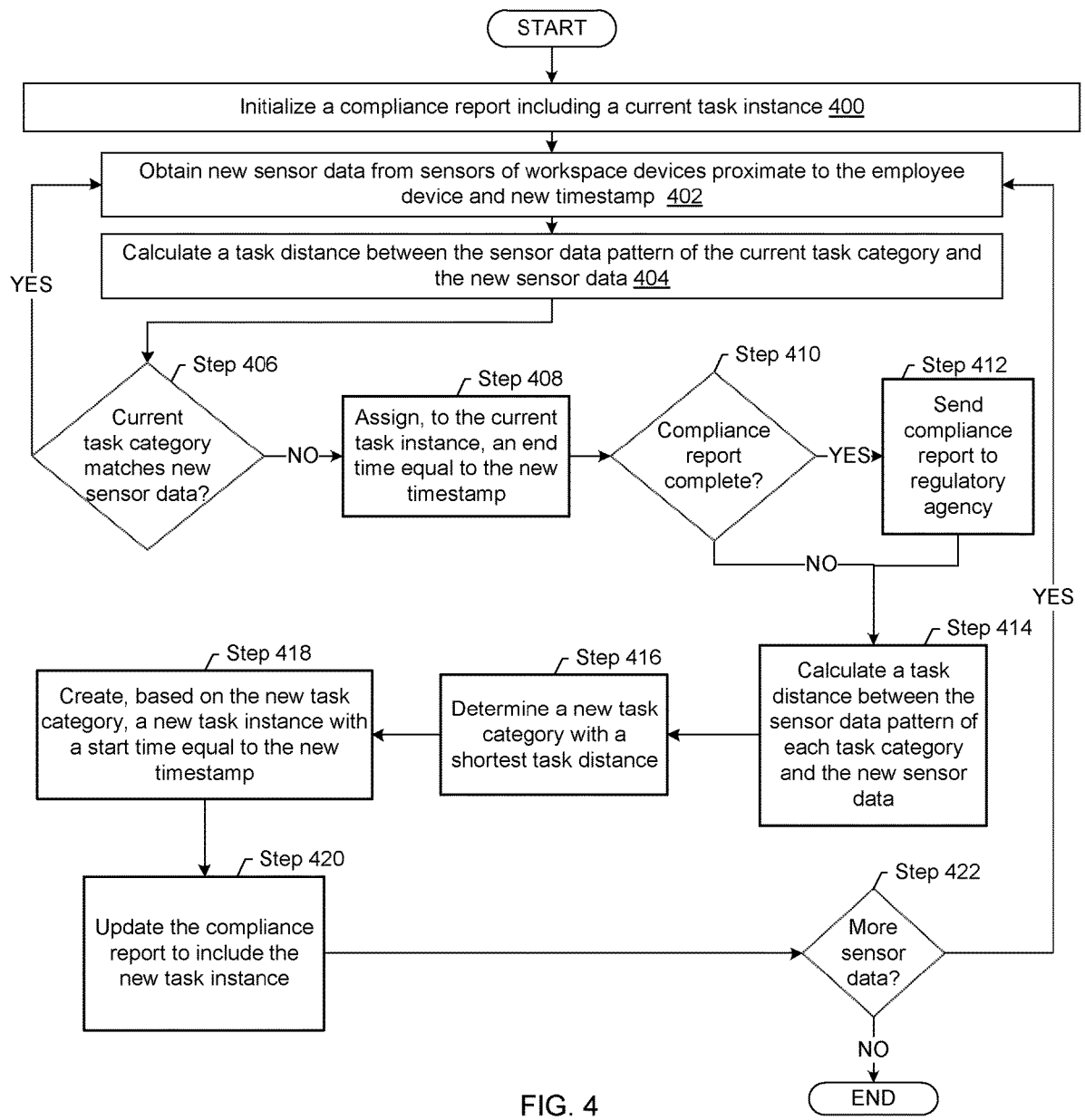

Once an initial task instance has been created in Step 208 above, execution may continue according to the flowchart in FIG. 3 or the flowchart in FIG. 4, depending on the purpose for identifying the employee's task. For example, execution may continue according to the flowchart in FIG. 3 in order to generate or update an invoice based on the task instance. Alternatively, execution may proceed according to the flowchart in FIG. 4 in order to generate or update a compliance report based on the task instance.

FIG. 3 shows a flowchart in accordance with one or more embodiments of the invention. The flowchart depicts a process for generating an invoice. One or more of the steps in FIG. 3 may be performed by the components of the task identification computing device (100), discussed above in reference to FIG. 1A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a current customer is identified using geolocation data obtained from a GPS sensor of an employee device. For example, the employee device may be the employee device referenced in Step 200. That is, geolocation data of the employee device may be compared to geolocation data corresponding to various customer addresses in order to identify a customer closest to the employee device. In one or more embodiments, contextual information obtained from a BMA may facilitate the identification of the current customer (e.g., the employee's online calendar may indicate a visit to a specific customer).

In Step 302, a current invoice is initialized for the current customer, including a current task instance. For example, the current task instance may be the initial task instance created in Step 208. The current task instance may correspond to a current task category (e.g., the initial task category determined in Step 206).

In Step 304, new sensor data and a new timestamp are obtained. In one or more embodiments, the new sensor data includes geolocation sensor data obtained from sensors of one or more workspace devices proximate to an employee device (e.g., the employee device referenced in Step 200), in addition to the sensors of the employee device. The workspace devices proximate to the employee device may be different from the workspace devices referenced in Step 200 (i.e., the workspace devices contributing initial sensor data). That is, the employee may be in a different location whenever new sensor data is obtained, and therefore the proximate workspace devices may be different.

Step 304 begins a loop that processes new sensor data, ending with Step 330. In one or more embodiments, a predefined sensor data sampling rate parameter determines how frequently new sensor data is obtained. In one or more embodiments, the loop beginning in Step 304 may be triggered by the activation of a proximity sensor (e.g., a geo-fence or beacon). That is, a signal received from a proximity sensor may be correlated with initiating a task instance in a specific task category. For example, when a farm employee enters an area enclosed by a geo-fence, triggering a proximity signal from the geo-fence, an animal handling task category may be identified (e.g., the sensor data may indicate that an employee device is in close proximity to a tracking device on a farm animal).

In Step 306, a task distance between the sensor data pattern of the current task category and the new sensor data is calculated. See earlier description of Step 204.

If, in Step 308, it is determined that the current task category matches the new sensor data, then execution continues with another iteration of the loop beginning with Step 304 above. That is, the current task category matches the new sensor data when the task distance between the sensor data pattern of the current task category and the new sensor data remains within the predefined maximum task distance (see earlier description of Step 206). In one or more embodiments, when the current task category matches the new sensor data, the current task instance is still in progress.

Otherwise, in Step 310, an end time equal to the new timestamp is assigned to the current task instance. That is, when the new sensor data has deviated from the sensor data pattern of the current task category (e.g., the task distance for the current task category has exceeded the predefined maximum task distance), the current task instance has been completed.

If, in Step 312, it is determined that the current invoice is complete, then in Step 314 the current invoice is sent to the current customer (e.g., in real time). For example, the current invoice may be determined to be complete once the employee device has become closer to a customer other than the current customer (e.g., indicating that the employee has relocated to a different customer site). Alternatively, there may be an explicit ending criterion associated with the current invoice. For example, in one or more embodiments, there may be a work order (e.g., in a BMA) that itemizes the various task instances associated with the current invoice, such that all itemized task instances must be completed before the invoice can be considered complete.

In Step 316, a task distance between the sensor data pattern of each task category and the new sensor data is calculated. See earlier description of Step 204.

In Step 318, a new task category is determined, where the new task category has a shortest task distance. In one or more embodiments, the shortest task distance is less than the predefined maximum task distance.

In Step 320, a new task instance is created based on the new task category, with a start time equal to the new timestamp.

If, in Step 322, the current customer is still the closest customer to the employee device (see previous description of Step 300), then in Step 324 the current invoice is updated to include the new task instance. In one or more embodiments, the partially complete invoice may be sent to the customer via email or via a BMA (e.g., an invoicing application), to provide a real-time update regarding the progress of the task instances of the invoice, now that one of the task instances has been completed.

Alternatively, if in Step 320 it is determined that a new customer is the closest customer to the employee device, then in Step 326 a new invoice is initialized for the new customer, including the new task instance (i.e., the new task instance created in Step 318).

Step 330 initiates another iteration of the loop beginning with Step 304 above to obtain additional new sensor data, where the new customer becomes the current customer, the new invoice becomes the current invoice, the new task category becomes the current task category, and the new task instance becomes the current task instance. Execution may end if there is no additional sensor data to be obtained. Alternatively, execution may be suspended until additional sensor data becomes available.

In one or more embodiments, the sensor data sampling rate may be increased. For example, if Step 316 identifies two task categories whose task distances are both within the predefined maximum task distance, then it may be unclear which task category best matches the new sensor data. For example, an employee device may be (temporarily) in close proximity to more than one tool, or more than one factory machine. In one or more embodiments, when the task distances for these two task categories are within a predefined minimum distance of each other, then identifying the correct task category is ambiguous. In this case, the sensor data sampling rate may be increased to eliminate the ambiguity as quickly as possible, by gathering additional sensor data in an attempt to discern the unfolding pattern of the sensor data, such that the task distances for these two task categories are no longer within a predefined minimum distance. For example, as additional sensor data is obtained, the employee device may become much closer to one of the tools or machines.

FIG. 4 shows a flowchart in accordance with one or more embodiments of the invention. The flowchart depicts a process for generating a compliance report. One or more of the steps in FIG. 4 may be performed by the components of the task identification computing device (100), discussed above in reference to FIG. 1A. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in Step 400, a compliance report is initialized including a current task instance. For example, the current task instance may be the initial task instance created in Step 208. The current task instance may correspond to a current task category (e.g., the initial task category determined in Step 206).

In Step 402, new sensor data and a new timestamp are obtained. In one or more embodiments, the new sensor data includes geolocation sensor data obtained from sensors of one or more workspace devices proximate to an employee device (e.g., the employee device referenced in Step 200), in addition to the sensors of the employee device. Step 402 begins a loop that processes new sensor data, ending with Step 422. See earlier description of Step 304.

In Step 404, a task distance between the sensor data pattern of the current task category and the new sensor data is calculated. See earlier description of Step 204.

If, in Step 406, it is determined that the current task category matches the new sensor data, then execution continues with another iteration of the loop beginning with Step 402 above. See earlier description of Step 308.

Otherwise, in Step 408, an end time equal to the new timestamp is assigned to the current task instance. See earlier description of Step 310.

If, in Step 410, it is determined that the compliance report is complete, then in Step 412 the compliance report is sent to an appropriate regulatory agency. For example, the compliance report may be completed at the end of each week. The compliance report may be sent via email or may be sent via a BMA (e.g., a compliance application), in real time.

In Step 414, a task distance between the sensor data pattern of each task category and the new sensor data is calculated. See earlier description of Step 204.

In Step 416, a new task category is determined, where the new task category has a shortest task distance.

In Step 418, a new task instance is created based on the new task category, with a start time equal to the new timestamp.

In Step 420, the compliance report is updated to include the new task instance.

Step 422 initiates another iteration of the loop beginning with Step 402 above to obtain additional new sensor data, where the new task category becomes the current task category, and the new task instance becomes the current task instance. Execution may end if there is no additional sensor data to be obtained. Alternatively, execution may be suspended until additional sensor data becomes available. See earlier description of Step 330.

Figure 5A:
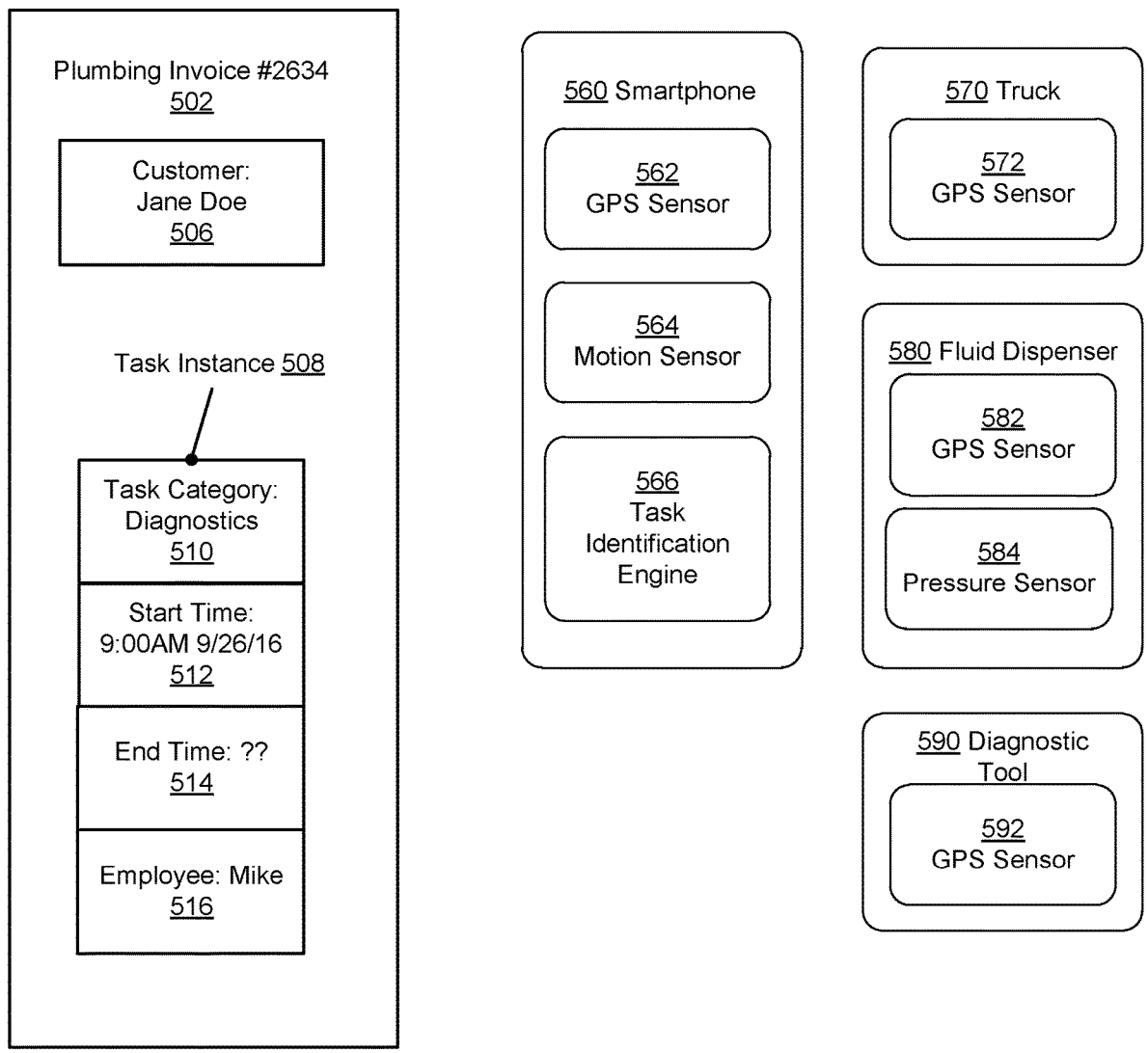
FIG. 5A and FIG. 5B show examples in accordance with one or more embodiments disclosed herein.

The following implementation example is for explanatory purposes only and not intended to limit the scope of the invention. FIG. 5A, FIG. 5B, FIG. 5C, FIG. 5D, and FIG. 5E show invoices and workspace devices in accordance with one or more embodiments of the invention. FIG. 5A shows that a plumber named Mike has the following workspace devices: a smartphone (560), a truck (570), a fluid dispenser (580), and a diagnostic tool (590). The smartphone (560) has a geolocation sensor, such as GPS sensor (562), a motion sensor (564) and a task identification engine (566) (i.e., the smartphone (560) is also a task identification computing device). The truck (570) has a geolocation sensor, such as GPS sensor (572). The fluid dispenser (580) has a geolocation sensor, such as GPS sensor (582) and a pressure sensor (584). The diagnostic tool (590) has a geolocation sensor, such as GPS sensor (592).

At 9:00 AM (as indicated by a timestamp obtained from Mike's smartphone (560)), sensor data is obtained from the sensors of the workspace devices by the task identification engine (566). The task category that best matches the sensor data is the Diagnostics task category (510), which specifies a sensor data pattern requiring the distance between an employee device (i.e., Mike's smartphone (560)) relative to a diagnostic tool (590) be less than 1 foot. A customer, Jane Doe (506) is automatically identified by finding the customer whose GPS data (e.g., obtained by converting customer addresses into GPS coordinates) is closest to the GPS data obtained from the GPS sensor (562) of Mike's smartphone (560).

A Diagnostics task instance (508) is generated with a 9:00 AM start time (512) and Mike as the employee (516). However, the end time (514) is initially blank, since when the initial sensor data is read at 9:00 AM, the end time (514) is unknown. The Diagnostics task instance (508) is added to a new invoice (502) for the customer (506).

Figure 5B:
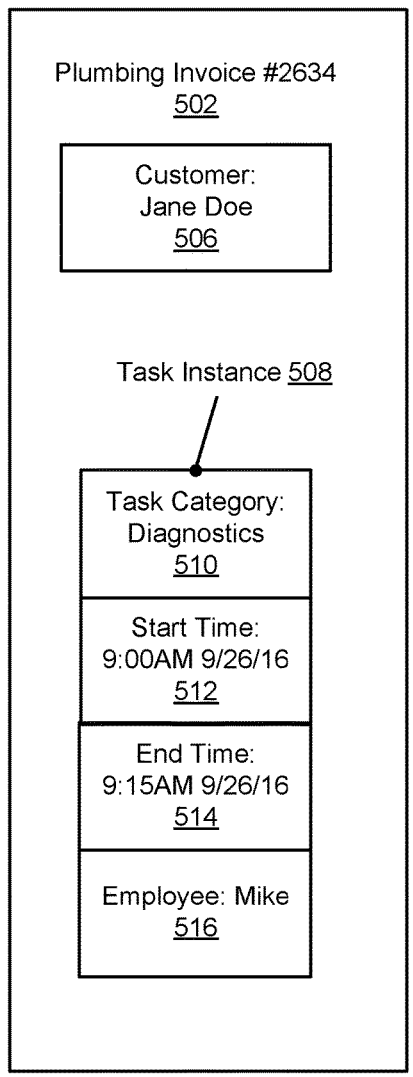

Additional sensor data is obtained at regular intervals, and the task category that best matches the additional sensor data continues to be the Diagnostics task category (510), until 9:15 AM, when it is discovered that no task category matches the additional sensor data. This suggests that the Diagnostics task instance (508) has been completed, and the 9:15 AM end time (514) is added to the task instance (508), as illustrated in FIG. 5B.

Figure 5C:
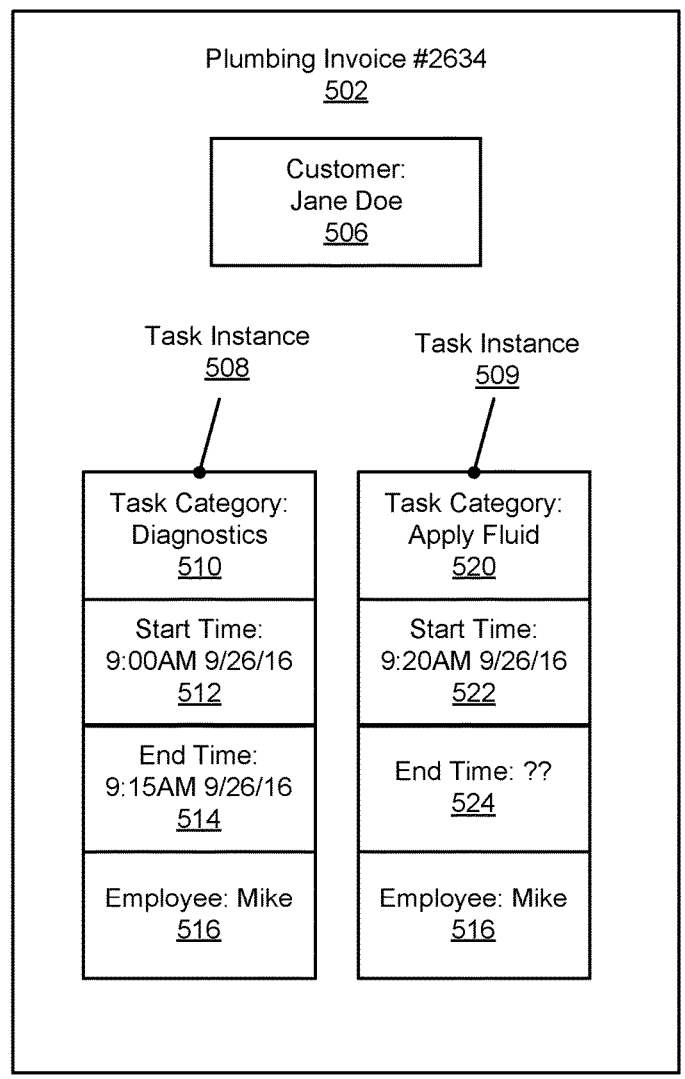
FIG. 5C, FIG. 5D, and FIG. 5E show examples in accordance with one or more embodiments disclosed herein.

Additional sensor data is obtained at regular intervals without identifying a new task category (e.g., a task category with a task distance below the predefined maximum task distance). Then, at 9:20 AM, the Apply Fluid task category (520) best matches the additional sensor data. The Apply Fluid task category (520) specifies a sensor data pattern based on pressure sensor data obtained from the pressure sensor (584) of the fluid dispenser (580). The sensor data pattern requires that the pressure data obtained from the pressure sensor (584) indicate increased pressure (e.g., which correlates with fluid being dispensed from the fluid dispenser (580)). Alternatively, the Apply Fluid task category (520) may specify a sensor data pattern based on the motion of an employee device (e.g., Mike's smartphone (560)). The sensor data pattern may require that the motion of the smartphone (560) follow a specific pattern of movement and rest at regular intervals (e.g., that correlates with the motion of dispensing fluid from a fluid dispenser (580)). An Apply Fluid task instance (509) is generated with a 9:20 AM start time (522) and Mike as the employee (516), where the end time (524) is initially blank, as illustrated in FIG. 5C. The Apply Fluid task instance (509) is added to the invoice (502).

Figure 5D:
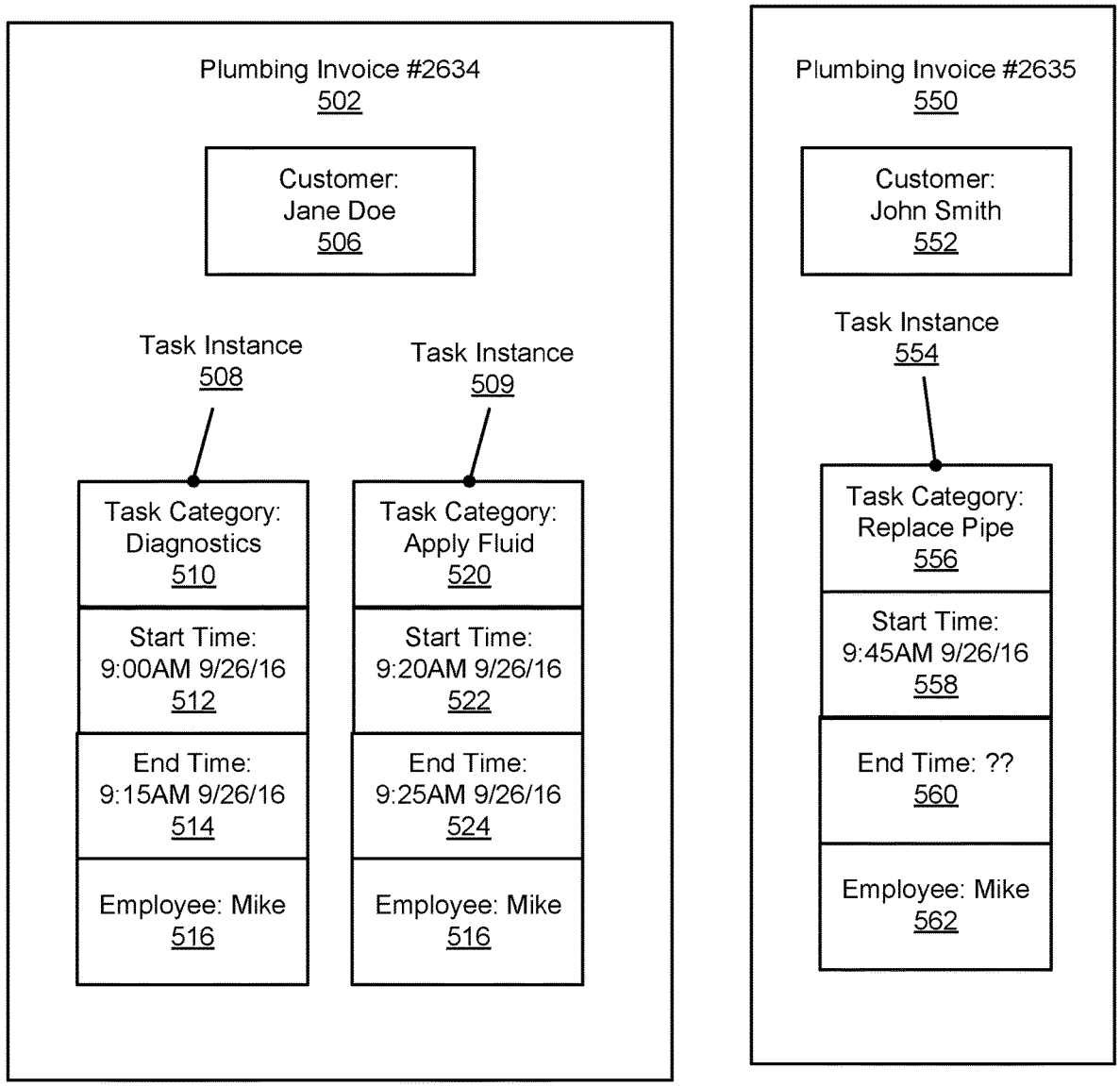

Additional sensor data is then obtained at regular intervals, and the task category that best matches the additional sensor data continues to be the Apply Fluid task category (520), until 9:25 AM, when it is discovered that no task category matches the additional sensor data. This suggests that the corresponding Apply Fluid task instance (509) has been completed, and the 9:25 AM end time (524) is added to the Apply Fluid task instance (509), as illustrated in FIG. 5D.

The invoice (502) is now complete and may be sent to the customer (506), since each task instance (508, 509) corresponding to a task category (510, 520) has been completed (e.g., according to a work order obtained from a BMA that listed the two task categories Diagnostics (510) and Apply Fluid (520)).

Figure 5E:
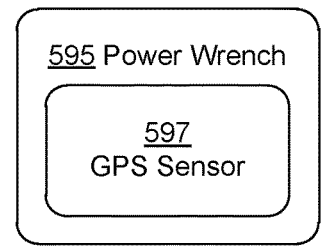

As Mike drives to the next customer, no task categories match the additional sensor data, which is still obtained at regular intervals. Then Mike arrives at the next customer (552), John Smith. At 9:45 AM, sensor data is obtained that matches a Replace Pipe task category (556), which specifies a sensor data pattern based on the close proximity of an employee device (e.g., Mike's smartphone (560)) and a power wrench (595) equipped with a geolocation sensor, such as GPS sensor (597), that Mike has just unloaded from his truck. A Replace Pipe task instance (554) is generated with a 9:45 AM start time (558) and Mike as the employee (562), with a blank end time (560). The Replace Pipe task instance (554) is added to a new invoice (550) for customer John Smith (552), as shown in FIG. 5E. The next customer (552) is again automatically identified by finding the customer whose corresponding GPS data is closest to Mike's smartphone (560) (or truck (570)).

The task identification engine (566) then discovers that the new invoice (550) for customer John Smith (552) has a corresponding work order (e.g., obtained from a BMA) that lists a series of task categories corresponding to the expected work to be performed. However, the work order does not include the Replace Pipe task category (556). Therefore, the task identification engine (566) triggers an alert so that the discrepancy can be resolved.

The following implementation example is for explanatory purposes only and not intended to limit the scope of the invention. FIG. 6A, FIG. 6B, FIG. 6C, and FIG. 6D show compliance reports and workspace devices in accordance with one or more embodiments of the invention. Rick is a farmhand who performs animal handling tasks in a grazing area enclosed by a geo-fence (670) as well as various other tasks on a farm. Animals are tracked via animal trackers (680). Rick works with the following workspace devices: a smartphone (660), the geo-fence (670), animal trackers (680), and an irrigation system (690). The smartphone (660) has a geolocation sensor, such as a GPS sensor (662), and a task identification engine (664), the geo-fence (670) has a geolocation sensor, such as GPS sensor (672), the animal tracker (680) has a geolocation sensor, such as GPS sensor (682), and the irrigation system (690) has a geolocation sensor, such as GPS sensor (692).

At 9:00 AM, Rick enters the region enclosed by the geo-fence (670), triggering the task identification engine (664) to obtain sensor data from nearby workspace devices. The Animal Handling task category (610) best matches the sensor data, and specifies a sensor data pattern based on the distance between an employee device (i.e., Rick's smartphone (660)), and an animal tracker (680). The sensor data pattern indicates that the positions of the smartphone (560) and the animal tracker (680) be within a certain target distance (e.g., 2 feet). An Animal Handling task instance (606) is generated with a 9:00 AM start time (512) and Rick as the employee (616).

The task identification engine (664) discovers that the Animal Handling task category (610) specifies a task constraint requiring that the employee performing this task possess an animal handling certificate. The task identification engine (664) verifies that Rick possesses this qualification (e.g., by querying Rick's employee information in a data repository over a network accessed by the smartphone (560)).

Figure 6A:
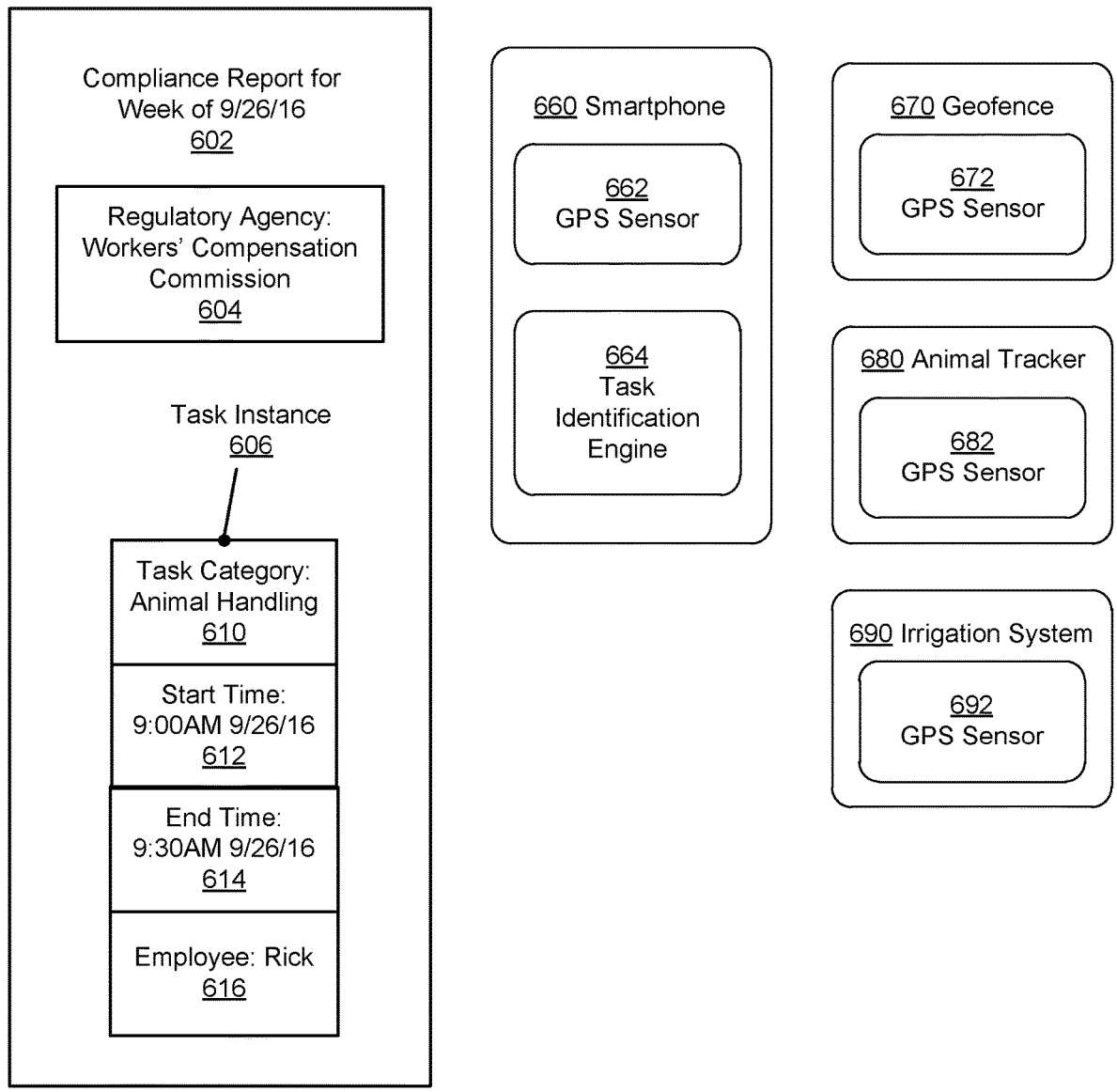
FIG. 6A and FIG. 6B show examples in accordance with one or more embodiments disclosed herein.

The Animal Handling task instance (606) is added to a new compliance report (602), as shown in FIG. 6A. Subsequently obtained sensor data indicates that this Animal Handling task instance (606) is completed at an end time (614) of 9:30 AM, when Rick exits the area enclosed by the geo-fence (670), again triggering the task identification engine (664) to obtain sensor data from nearby workspace devices, when it is then discovered that Animal Handling task category (610) no longer matches the additional sensor data.

Figure 6B:
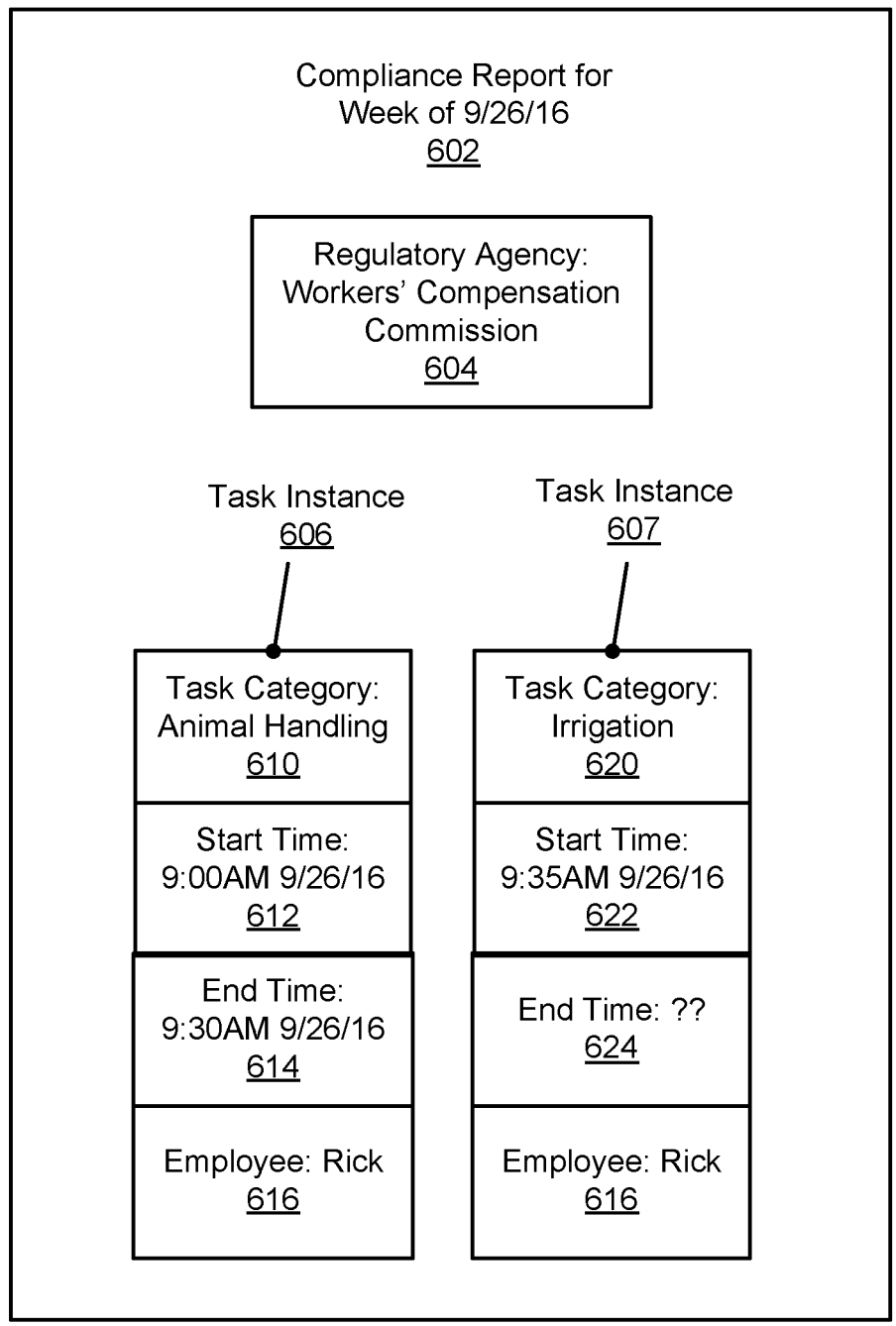

Additional sensor data obtained at 9:35 AM, indicates that Rick has moved on to an Irrigation task category (620) that specifies a sensor data pattern based on the distance between an employee device (i.e., Rick's smartphone (660)) and the irrigation system (690). An Irrigation task instance (607) is generated with a 9:35 AM start time (622) and Rick as the employee (616). The Irrigation task instance (607) is added to the compliance report (602), as shown in FIG. 6B. Additional sensor data obtained at regular intervals indicate that the Irrigation task category (620) remains the closest matching task category until 10:10 AM, when one of the animals (a cow) wanders into the vicinity of the irrigation system (690), to Rick's surprise.

Figure 6C:
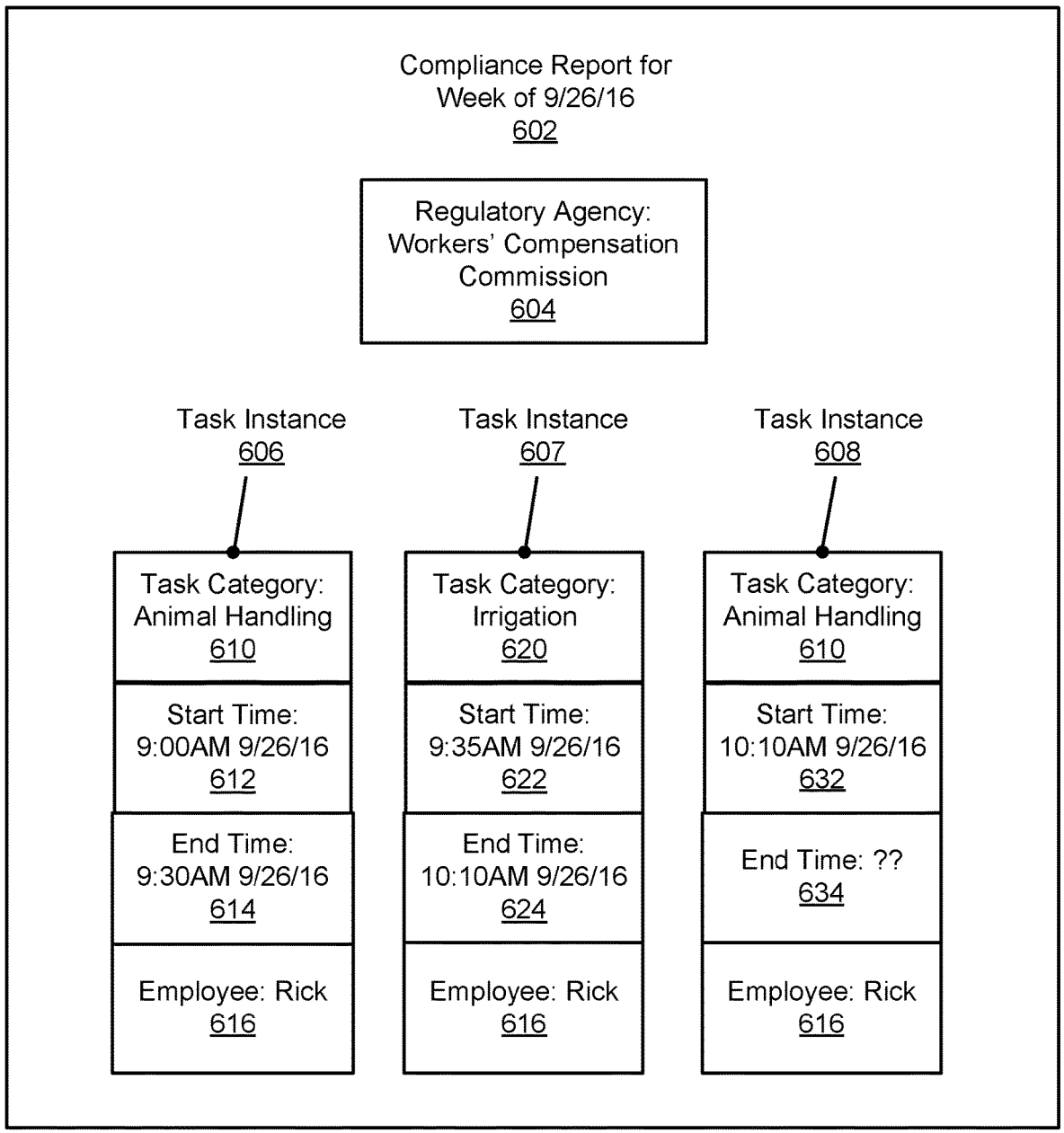
FIG. 6C and FIG. 6D show examples in accordance with one or more embodiments disclosed herein.
Figure 6D:
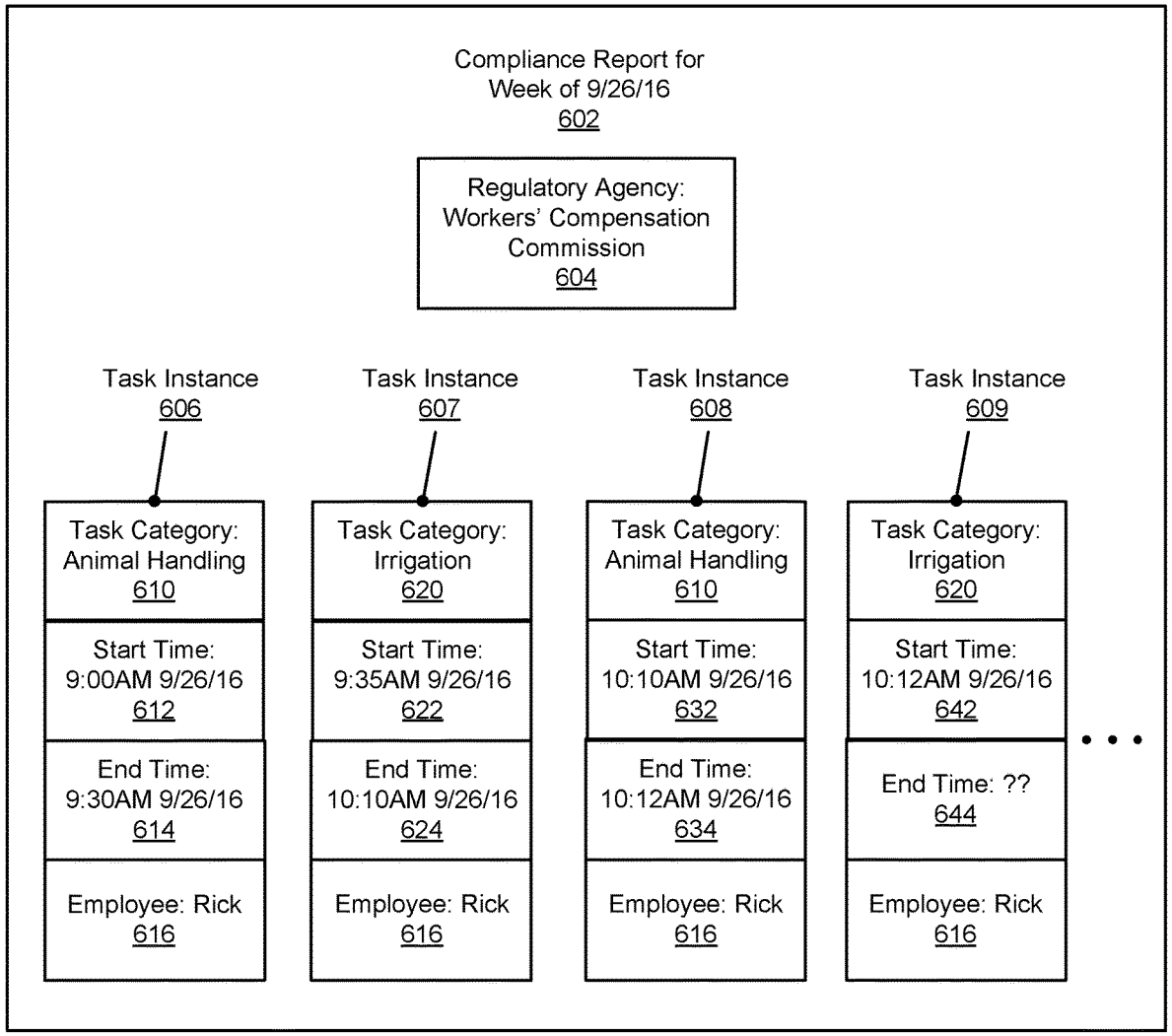

At that moment, sensor data is obtained, and there are two task categories that are good matches for the sensor data, due to the close proximity of Rick to both the animal device (680) and the irrigation system (690): the Irrigation task category (620), as well as the Animal Handling task category (610). To resolve this ambiguity, the task identification engine (664) increases the rate of sampling sensor data from the workspace devices to determine which task category will be the best match as the sensor data pattern unfolds. The task identification engine then determines that the Animal Handling task category (610) is the best match, as Rick interrupts the Irrigation task instance (607) to escort the wayward animal back away from the irrigation system (690). The irrigation task instance (607) is ended at 10:10 AM, and a second Animal Handling task instance (608) is created with a 10:10 AM start time (622), as shown in FIG. 6C. Once the second Animal Handling task instance (608) is completed, Rick resumes his work on the irrigation system (690), and a second Irrigation task instance (609) is created with a start time (642) of 10:12 AM, as shown in FIG. 6D. The compliance report (602) may include task instances corresponding to other farmhands beside Rick. At the end of the reporting interval (e.g., at the end of the week), the compliance report (602) is sent to the appropriate regulatory agency.

Figure 7A:
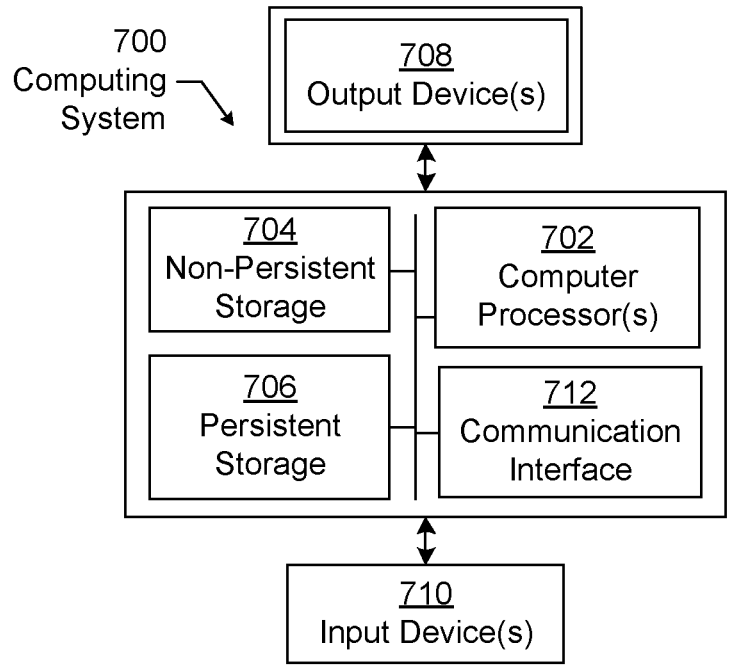
FIG. 7A and FIG. 7B show computing systems in accordance with one or more embodiments disclosed herein.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7B:
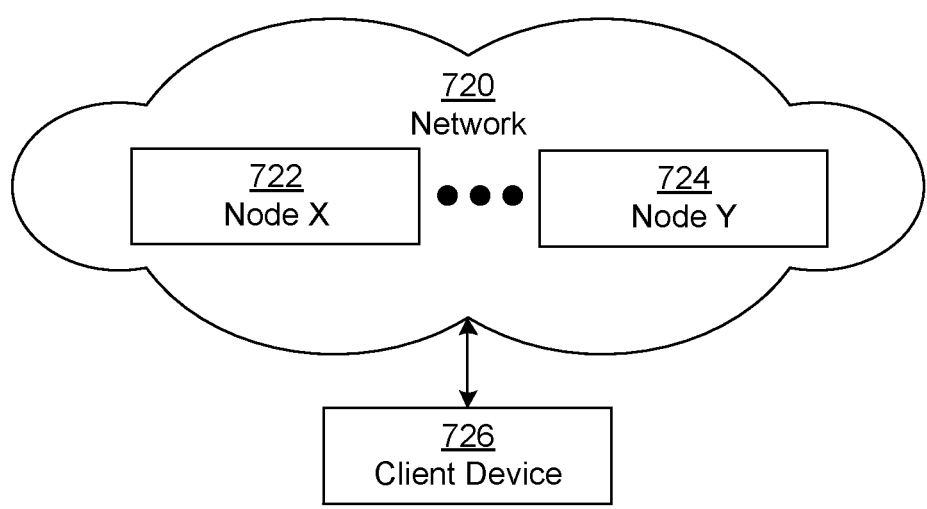

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments disclosed herein.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining, over a network and at a sampling rate, a first plurality of sensor data from a first plurality of sensors of a first plurality of workspace devices and a first timestamp corresponding to the first plurality of sensor data,
   wherein the first plurality of sensors of each workspace device of the first plurality of workspace devices comprises a geolocation sensor and a motion sensor, and
   wherein the first plurality of workspace devices comprises an employee device corresponding to an employee;
   obtaining a plurality of task categories, each task category comprising a sensor data pattern which describes a corresponding pattern of geolocation and motion sensor data that is consistent with performing a corresponding task instance in a corresponding task category;
   calculating, for each task category of the plurality of task categories, a task distance between the sensor data pattern corresponding to the task category and the first plurality of sensor data,
      wherein the task distance is a non-physical distance that represents an amount of correlation between a first data set comprising a given task category and a second data set comprising the first plurality of sensor data, wherein the task distance comprises a confidence level that the given task category corresponds to the first plurality of sensor data, and
      wherein the task distance further comprises a combination of attribute distances, the combination created by applying weighting factors to the attribute distances, the attribute distances comprising distances between attribute values of the sensor data relative to corresponding target attribute values specified in the sensor data pattern;
   determining a first task category of the plurality of task categories based on the first task category having a first task distance that is shortest;
   increasing the sampling rate when the first task distance is within a predefined minimum distance of a second task distance of a second task category of the plurality of task categories;
   determining, after increasing the sampling rate, that the task distances corresponding to the first task category and the second task category are no longer within the predefined minimum distance;
   creating, based on the first task category, a first task instance with a start time equal to the first timestamp, wherein the first task instance is assigned to the employee;
   generating, automatically using the first task instance, at least one of an invoice and a compliance report; and
   storing, in a data repository, the at least one of the invoice and the compliance report.

2. The method of claim 1, further comprising:
   generating an alert, based on determining that the first task instance violates a task constraint, wherein the first task category further comprises the task constraint.

3. The method of claim 1, wherein determining the first task category is further based on information obtained from a business management application (BMA).

4. The method of claim 1, wherein the invoice is generated as a first invoice, and further comprising:
   identifying a first customer using geolocation data obtained from the geolocation sensor of the employee device;
   obtaining, over the network and after increasing the sampling rate, a second plurality of sensor data from a second plurality of sensors of a second plurality of workspace devices and a second timestamp corresponding to the second plurality of sensor data,
   wherein the second plurality of sensors of each workspace device of the second plurality of workspace devices comprises the geolocation sensor, and
   wherein the second plurality of workspace devices comprises the employee device.

5. The method of claim 4, further comprising:
   recalculating, using the second plurality of sensor data, the first task distance;
   assigning, to the first task instance and based on a determination that the first task distance exceeds a predefined maximum task distance, an end time equal to the second timestamp; and
   sending, over the network and based on a determination that the first invoice satisfies an invoice completion criterion, the first invoice to the first customer.

6. The method of claim 4, further comprising:
   calculating, for each task category of the plurality of task categories, a task distance between the sensor data pattern of the task category and the second plurality of sensor data;
   determining a second task category of the plurality of task categories based on the second task category having a task distance that is shortest;
   creating, based on the second task category, a second task instance comprising a start time equal to the second timestamp, wherein the second task instance is assigned to the employee; and
   updating the first invoice to further comprise the second task instance.

7. The method of claim 1, wherein the compliance report is generated, and further comprising:

obtaining, over the network, a second plurality of sensor data from a first plurality of sensors of a second plurality of workspace devices and a second timestamp corresponding to the second plurality of sensor data,
wherein the first plurality of sensors of each workspace device of the second plurality of workspace devices comprises a geolocation sensor, and
wherein the second plurality of workspace devices comprises the employee device.

8. The method of claim 7, further comprising:
calculating a third task distance between the sensor data pattern of the first task category and the second plurality of sensor data;
assigning, to the first task instance and based on a determination that the third task distance exceeds a predefined maximum task distance, an end time equal to the second timestamp; and
sending, over the network and based on a determination that the compliance report satisfies a compliance report completion criterion, the compliance report to a regulatory agency.

9. A system, comprising:
a task identification engine computing device comprising a temporal engine, a computer processor and a memory comprising instructions that, when executed by the computer processor, cause the computer processor to:
obtain, over a network and at a sampling rate, a first plurality of sensor data from a first plurality of sensors of a first plurality of workspace devices and a first timestamp corresponding to the first plurality of sensor data,
wherein the first plurality of sensors of each workspace device of the first plurality of workspace devices comprises a geolocation sensor, and
wherein the first plurality of workspace devices comprises an employee device corresponding to an employee,
obtain a plurality of task categories, each task category comprising a sensor data pattern which describes a corresponding pattern of geolocation and motion sensor data that is consistent with performing a corresponding task instance in a corresponding task category,
calculate, for each task category of the plurality of task categories, a task distance between the sensor data pattern corresponding to the task category and the first plurality of sensor data,
wherein the task distance is a non-physical distance that represents an amount of correlation between a first data set comprising a given task category and a second data set comprising the first plurality of sensor data, wherein the task distance comprises a confidence level that the given task category corresponds to the first plurality of sensor data, and
wherein the task distance further comprises a combination of attribute distances, the combination created by applying weighting factors to the attribute distances, the attribute distances comprising distances between attribute values of the sensor data relative to corresponding target attribute values specified in the sensor data pattern;
determine a first task category of the plurality of task categories based on the first task category having a first task distance that is shortest,
increase the sampling rate when the first task distance is within a predefined minimum distance of a second task distance of a second task category of the plurality of task categories;
determine, after increasing the sampling rate, that the task distances corresponding to the first task category and the second task category are no longer within the predefined minimum distance;
create, based on the first task category, a first task instance with a start time equal to the first timestamp, wherein the first task instance is assigned to the employee;
generate, automatically using the first task instance, at least one of an invoice and a compliance report; and
store the at least one of the invoice and the compliance report; and
a repository storing at least the first plurality of sensor data, the plurality of task categories, and the at least one of the invoice and the compliance report.

10. The system of claim 9, wherein the compliance report is generated, and wherein the memory further comprises instructions that, when executed by the processor, cause the processor to:
obtain, over the network, a second plurality of sensor data from a first plurality of sensors of a second plurality of workspace devices and a second timestamp corresponding to the second plurality of sensor data, wherein the first plurality of sensors of each workspace device of the second plurality of workspace devices comprises a geolocation sensor, and wherein the second plurality of workspace devices comprises the employee device;
calculate a third task distance between the sensor data pattern of the first task category and the second plurality of sensor data;
assign, to the first task instance and based on a determination that the third task distance exceeds a predefined maximum task distance, an end time equal to the second timestamp; and
send, over the network and based on a determination that the compliance report satisfies a compliance report completion criterion, the compliance report to a regulatory agency.

11. The system of claim 9, wherein the invoice is stored on the repository as a first invoice, and wherein the memory further comprises instructions that, when executed by the processor, cause the processor to:
identify a first customer using geolocation data obtained from the geolocation sensor of the employee device;
obtain, over the network and after increasing the sampling rate, a second plurality of sensor data from a second plurality of sensors of a second plurality of workspace devices and a second timestamp corresponding to the second plurality of sensor data, wherein the second plurality of sensors of each workspace device of the second plurality of workspace devices comprises the geolocation sensor, and wherein the second plurality of workspace devices comprises the employee device.

12. The system of claim 11, wherein the memory further comprises instructions that, when executed by the processor, cause the processor to:
recalculate, using the second plurality of sensor data, the first task distance;
assign, to the first task instance and based on a determination that the first task distance exceeds a predefined maximum task distance, an end time equal to the second timestamp; and send, over the network and based on a determination that the first invoice satisfies an invoice completion criterion, the first invoice to the first customer.

13. The system of claim 11, wherein the memory further comprises instructions that, when executed by the processor, cause the processor to:
calculate, for each task category of the plurality of task categories, a task distance between the sensor data pattern of the task category and the second plurality of sensor data;
determine a second task category of the plurality of task categories based on the second task category having a task distance that is shortest;
create, based on the second task category, a second task instance comprising a start time equal to the second timestamp, wherein the second task instance is assigned to the employee; and
update the first invoice to further comprise the second task instance.

14. A non-transitory computer readable medium comprising instructions that, when executed by a processor, perform a method comprising:
obtaining, over a network and at a sampling rate, a first plurality of sensor data from a first plurality of sensors of a first plurality of workspace devices and a first timestamp corresponding to the first plurality of sensor data, the first plurality of sensors of each workspace device of the first plurality of workspace devices comprising a geolocation sensor and a motion sensor, the first plurality of workspace devices comprising an employee device corresponding to an employee;
obtaining a plurality of task categories, each task category comprising a sensor data pattern which describes a corresponding pattern of geolocation and motion sensor data that is consistent with performing a corresponding task instance in a corresponding task category;
calculating, for each task category of the plurality of task categories, a task distance between the sensor data pattern of the task category and the first plurality of sensor data,
wherein the task distance is a non-physical distance that represents an amount of correlation between a first data set comprising a given task category and a second data set comprising the first plurality of sensor data, wherein the task distance comprises a confidence level that the given task category corresponds to the first plurality of sensor data, and
wherein the task distance further comprises a combination of attribute distances, the combination created by applying weighting factors to the attribute distances, the attribute distances comprising distances between attribute values of the sensor data relative to corresponding target attribute values specified in the sensor data pattern;
determining a first task category of the plurality of task categories based on the first task category having a first task distance that is shortest;
increasing the sampling rate when the first task distance is within a predefined minimum distance of a second task distance of a second task category of the plurality of task categories;
determining, after increasing the sampling rate, that the task distances corresponding to the first task category and the second task category are no longer within the predefined minimum distance;
creating, based on the first task category, a first task instance with a start time equal to the first timestamp, wherein the first task instance is assigned to the employee;
generating, automatically using the first task instance, at least one of an invoice and a compliance report; and
storing, in a data repository, the at least one of the invoice and the compliance report.

15. The non-transitory computer readable medium of claim 14, wherein the compliance report is generated, and wherein the method further comprises:
obtaining, over the network, a second plurality of sensor data from a first plurality of sensors of a second plurality of the plurality of workspace devices and a second timestamp corresponding to the second plurality of sensor data, wherein the first plurality of sensors of each workspace device of the second plurality of workspace devices comprises a geolocation sensor, and wherein the second plurality of workspace devices comprises the employee device;
calculating a third task distance between the sensor data pattern of the first task category and the second plurality of sensor data;
assigning, to the first task instance and based on a determination that the third task distance exceeds a predefined maximum task distance, an end time equal to the second timestamp; and
sending, over the network and based on a determination that the compliance report satisfies a compliance report completion criterion, the compliance report to a regulatory agency.

16. The non-transitory computer readable medium of claim 14, wherein the invoice is generated as a first invoice, and wherein the method further comprises:
identifying a first customer using geolocation data obtained from the geolocation sensor of the employee device;
obtaining, over the network and after increasing the sampling rate, a second plurality of sensor data from a second plurality of sensors of a second plurality of workspace devices and a second timestamp corresponding to the second plurality of sensor data, wherein the second plurality of sensors of each workspace device of the second plurality of workspace devices comprises the geolocation sensor, and wherein the second plurality of workspace devices comprises the employee device.

17. The non-transitory computer readable medium of claim 16, wherein the method further comprises:
recalculating, using the second plurality of sensor data, the first task distance;
assigning, to the first task instance and based on a determination that the first task distance exceeds a predefined maximum task distance, an end time equal to the second timestamp; and
sending, over the network and based on a determination that the first invoice satisfies an invoice completion criterion, the first invoice to the first customer.

18. The non-transitory computer readable medium of claim 16, wherein the method further comprises:
calculating, for each task category of the plurality of task categories, a task distance between the sensor data pattern of the task category and the second plurality of sensor data;
determining a second task category of the plurality of task categories based on the second task category having a task distance that is shortest;

creating, based on the second task category, a second task instance with a start time equal to the second timestamp, wherein the second task instance is assigned to the employee; and updating the first invoice to further comprise the second task instance.

* * * * *